F. W. SMITH & L. LARSEN.
ELECTRIC CONTROLLER.
APPLICATION FILED SEPT. 30, 1909.

951,852.

Patented Mar. 15, 1910.
4 SHEETS—SHEET 1.

WITNESSES:

INVENTORS
Frank W. Smith and
Louis Larsen

BY
Wm. B. Whitney
ATTORNEY

F. W. SMITH & L. LARSEN.
ELECTRIC CONTROLLER.
APPLICATION FILED SEPT. 30, 1909.

951,852.

Patented Mar. 15, 1910.
4 SHEETS—SHEET 2.

WITNESSES:

INVENTORS
Frank W. Smith and
Louis Larsen

BY
ATTORNEY

F. W. SMITH & L. LARSEN.
ELECTRIC CONTROLLER.
APPLICATION FILED SEPT. 30, 1909.

951,852.

Patented Mar. 15, 1910.
4 SHEETS—SHEET 3.

WITNESSES:

Frank W. Smith and
Louis Larsen INVENTORS

BY
W. B. Whitney
ATTORNEY

F. W. SMITH & L. LARSEN.
ELECTRIC CONTROLLER.
APPLICATION FILED SEPT. 30, 1909.

951,852.

Patented Mar. 15, 1910.
4 SHEETS—SHEET 4.

WITNESSES:
Frank W. Smith and
Louis Larsen INVENTORS

BY
Wm. B. Whitney
ATTORNEY

UNITED STATES PATENT OFFICE.

FRANK W. SMITH, OF WESTFIELD, NEW JERSEY, AND LOUIS LARSEN, OF NEW YORK, N. Y., ASSIGNORS TO SUNDH ELECTRIC COMPANY, A CORPORATION OF NEW YORK.

ELECTRIC CONTROLLER.

951,852.

Specification of Letters Patent. Patented Mar. 15, 1910.

Application filed September 30, 1909. Serial No. 520,382.

*To all whom it may concern:*

Be it known that we, FRANK W. SMITH, a citizen of the United States, residing at Westfield, in the county of Union and State of New Jersey, and LOUIS LARSEN, a citizen of the United States, residing in the city of New York, in the county and State of New York, have invented a new and useful Electric Controller, of which the following is a specification.

Our invention relates to controllers for electric motors, its object being to provide improved means for controlling and regulating the current used in operating such motors, especially when starting and stopping the same, as well as for safeguarding the motors while in use.

The invention consists in certain novel features of construction and combination of parts, as hereinafter set forth and more particularly pointed out in the claims.

Figure 1:
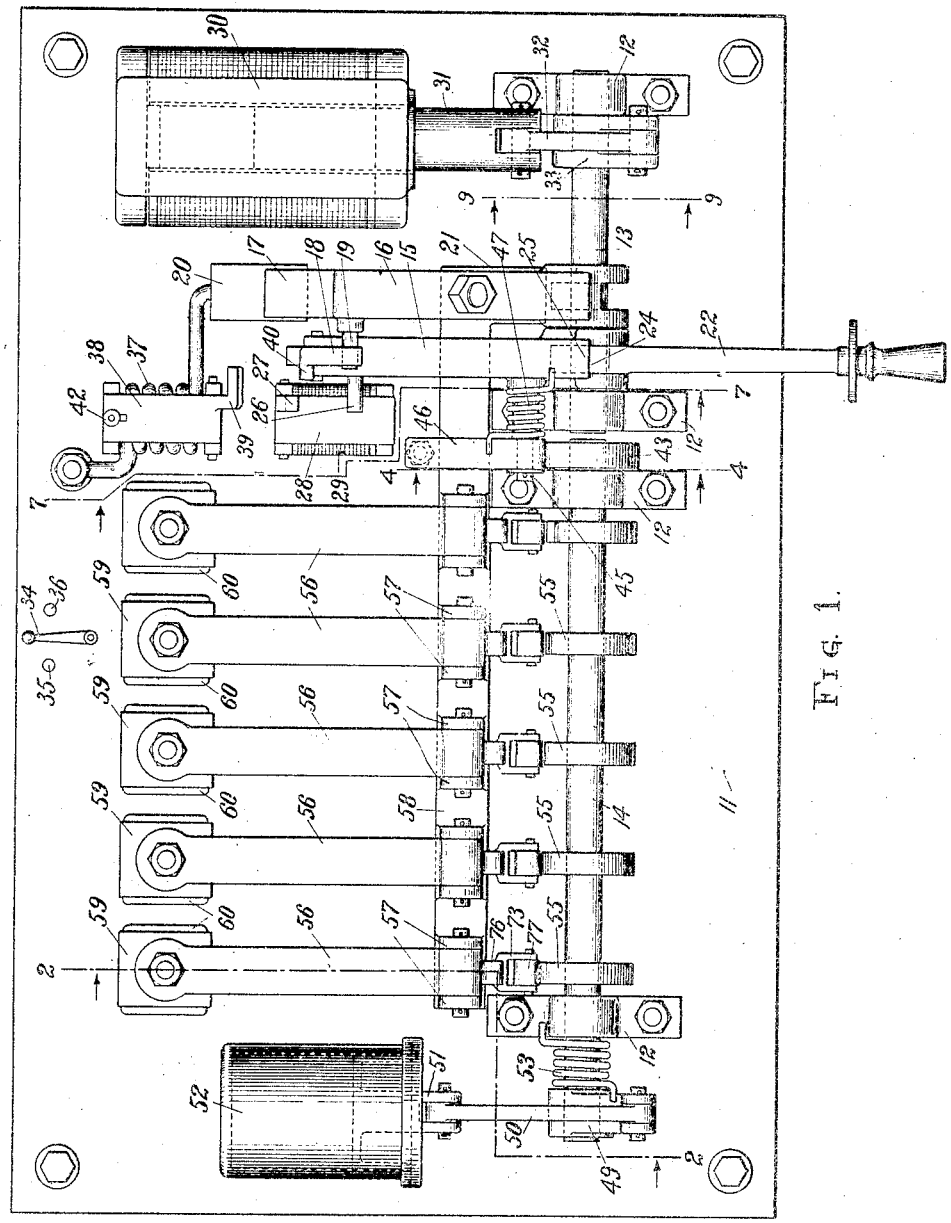
Figure 2:
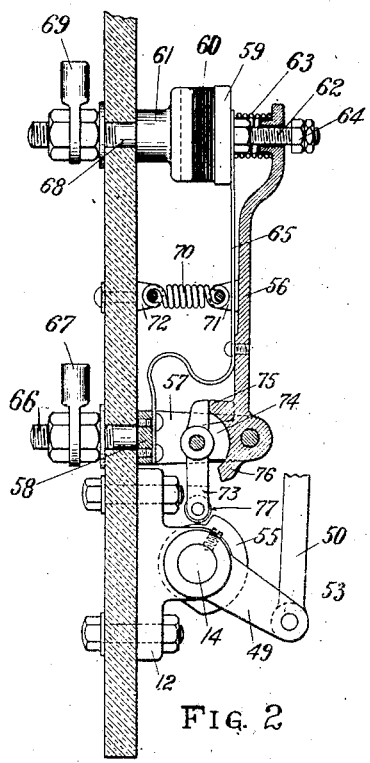
Figure 3:
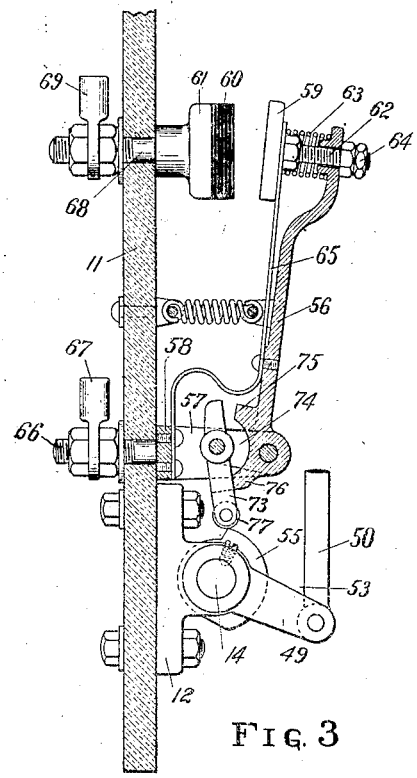
Figure 4:
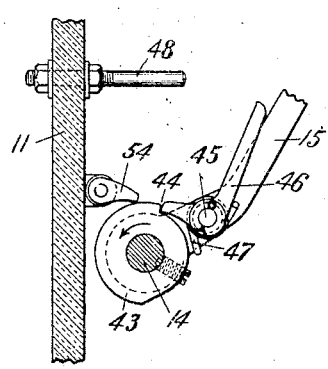
Figure 5:
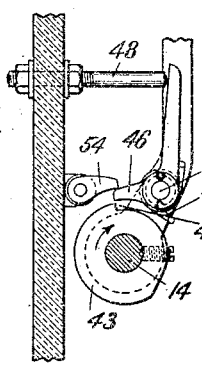
Figure 6:
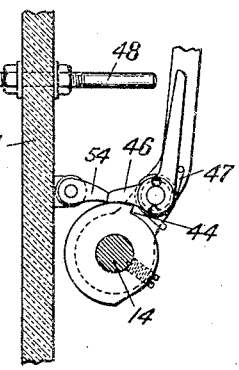
Figure 7:
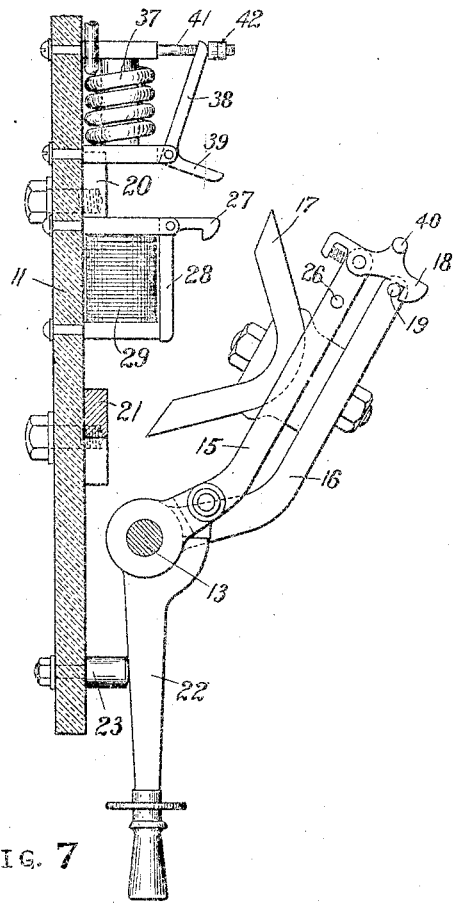
Figure 8:
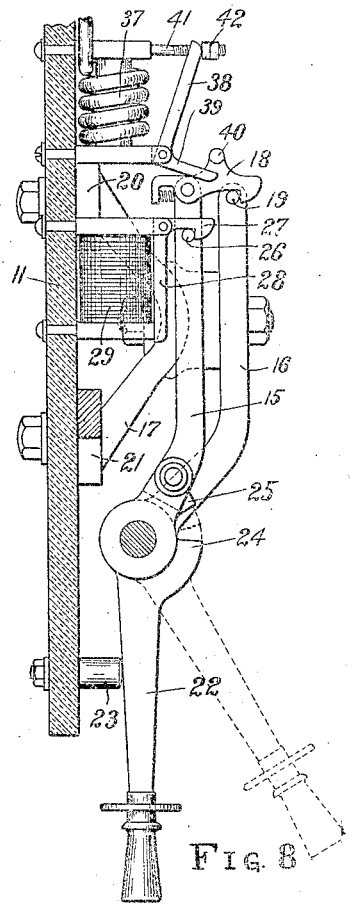
Figure 9:
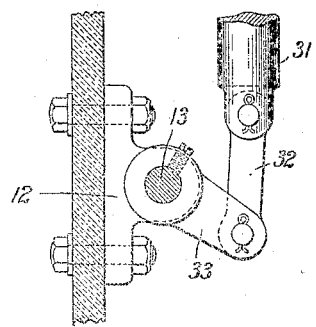

In the accompanying drawings wherein the same parts are indicated throughout by the same reference characters, Figure 1 is a view illustrating in front elevation a switchboard upon which is mounted one specific embodiment of our invention; Fig. 2, a broken detail view, partly in section on the line 2—2 of Fig. 1, illustrating one of the resistance or accelerating switches normally closed and with the parts in the position assumed immediately following the closing or preceding the opening of the switch; Fig. 3, a view similar to that of Fig. 2, but with the switch open and the parts in the position assumed immediately preceding the closing of the switch; Fig. 4, a broken detail view, partly in section on the line 4—4 of Fig. 1, illustrating the operative connection between the rock-shaft carrying the main circuit-closing switch and the cam-shaft through which the resistance switches are controlled; Figs. 5 and 6, views similar to that of Fig. 4, but with the parts in different positions; Fig. 7, a detail view, partly in section on the line 7—7 of Fig. 1, illustrating the main circuit-closing switch in open position; Fig. 8, a view similar to that of Fig. 7, but showing the main switch in closed position; Fig. 9, a broken detail view, partly in section on the line 9—9 of Fig. 1, illustrating the operative connection between the core or plunger of the solenoid and the rock-shaft carrying the main switch; and Fig. 10, a view in diagram illustrating the circuit connections and operation of the controller.

As here illustrated, the controller comprises, generally speaking, a main switch adapted to be operated either manually, by means of a hand-lever, or automatically, by the action of a solenoid, to close the motor circuits and start the motor, and to be retained in closed position until released by the breaking of the circuits or an overload upon the mains, and a series of resistance or accelerating switches which, by the preliminary movement of the main switch toward its closed position, are caused to open to insert resistance in the armature circuit of the motor, and, upon the closing of the main switch and the starting of the motor, are actuated to successively close and progressively cut out, step by step, the resistance in the armature circuit.

Referring to the drawings, 11 is the switchboard or supporting-plate of the apparatus, of non-conducting material, usually slate, which is secured to a wall or other support in any suitable manner. Journaled in bearings 12 secured to the face of the switchboard are the rock-shaft 13 and the cam-shaft 14, arranged end to end and in alinement with each other. A rock-lever 15, mounted upon to rotate with the rock-shaft 13, and a switch-lever 16, which, carrying the laminated brush circuit-closer 17 suitably mounted thereon and adapted to contact and electrically connect two contact-terminals 20 and 21 in the motor circuit, is loosely pivoted upon the rock-shaft and is locked to and rocks with the rock-shaft by the engagement of a spring-latch 18 pivoted at the upper end of the rock-lever with a pin 19 projecting from the side of the switch-lever, constitute the main switch by which the motor circuits are closed and opened to start and stop the motor.

A hand-lever 22, loosely pivoted upon the rock-shaft within the forked end of the rock-lever 15 and normally resting against a cushioned-stop 23, mounted upon the switchboard, has a radial shoulder 24 adapted to bear against an abutting shoulder 25 on the outer face of the rock-lever, thus providing means both for limiting the forward outer movement of the main switch and for manually closing the switch to start the motor. As the switch is thrown backward by the forward movement of the hand-lever, a pin 26 mounted in the side of the rock-lever pushes aside and, at the limit of its backward movement, comes into locking engagement with a hooked-lug 27 projecting outwardly from the pivoted upper end of the armature 28 of a magnet 29, which magnet is excited by the current in the mains upon the closing of the main switch, attracting and holding its armature and thereby locking the main switch in closed position. The hand-lever is then dropped and falls back against its cushioned-stop.

Automatic means for starting the motor are also provided by a solenoid 30, the coil of which is connected across the mains outside of the main switch while the lower end of its core or plunger 31 is connected by a pivoted link 32 with a rock-arm 33 mounted upon to rotate with the rock-shaft 13. Thus, the closing of the circuit through and consequent energization of the solenoid will draw up its plunger, rotate the rock-shaft, and close the main switch which is, or may be, held in closed position by the continued energization of the solenoid by a current preferably reduced, as is usual, to an amount just sufficient for the purpose by automatically throwing resistance into the circuit when the plunger reaches the upper end of its stroke.

A double-throw switch 34, conveniently mounted upon the switchboard, is thrown to one side, into contact with the terminal 35 in the magnet circuit, whenever the motor is to be started by means of the hand-lever, or into contact with the terminal 36 in the solenoid circuit, on the other side, to start the motor automatically or to close the solenoid circuit so that the motor may be started and stopped by the manipulation of a pilot-switch located at some other point therein.

The rock-lever 15 is released upon the breaking of the circuit of the magnet or of the solenoid, as the case may be, and with the switch-lever rocks forward by gravity until stopped by the engagement of its shoulder 25 with the shoulder 24 of the hand-lever, opening the motor circuits. Hence, the motor can be stopped by throwing the switch 34 to central open position, away from the terminal 35 or 36 with whichever one it was in contact, or by opening a pilot-switch at some other point in the solenoid circuit in case the controller is being operated automatically; and it is evident that it will also be stopped, in any case, whenever, for any reason, as upon the stopping of the generator or the blowing out of a fuse, a condition of no-voltage exists in the mains, thus safeguarding against injury from the sudden starting after an accidental stopping of the motor.

The motor is further safeguarded against an excessive current or overload in the mains, by a second magnet 37, the exciting coil of which is in series with the motor. Its armature 38, pivoted at its lower end, is rocked forward out of the magnetic field produced by normal currents in the motor circuits by the weight of an outwardly projecting lug or lever-arm 39, which is thereby inclined downwardly so that its outer end will normally lie below a pin 40 mounted in the side of the spring-latch 18 at the end of the rock-lever, when the main switch is closed, and will engage the pin and lift the latch whenever raised by the drawing back of the armature to the magnet upon an excessive current in the mains, thus releasing the switch-lever from the rock-lever and permitting it to rock forward by gravity and open the motor circuits. The distance at which the armature is normally held from the magnet, and consequently the action of the magnet, is regulated by a nut 42 upon a threaded bolt 41 which projects outwardly from the upper head of the magnet through a slot formed in the armature.

The cam-shaft 14, through which the resistance in the armature circuit of the motor is controlled, is actuated in the following manner: Mounted upon to rotate with the cam-shaft, at the end adjacent to the end of the rock shaft 13, is a disk 43, which is provided with a peripheral tooth or shoulder 44, and, in the plane of said disk and loosely pivoted upon the end of a post 45 projecting from the side of the rock-lever 15, is a bell-lever 46 the end of the lower arm of which is held in yielding contact with the periphery of the disk by a coiled spring 47 and will fall behind and into operative engagement with the shoulder of the disk when the main switch is open and the cam-shaft is in the position (Fig. 4) in which it is normally held. Thus, as the main switch is rocked to closed position, the engagement of the arm of the bell-lever with the shoulder of the disk will cause the cam-shaft to rotate with the rock-shaft until, as the main switch reaches the limit of its backward movement and closes the motor circuits, a fixed pin 48 projecting outwardly from the switchboard in the path of its upper arm trips the bell-lever, raises its lower arm out of engagement with the shoulder of the disk, and releases the cam-shaft (Fig. 5). Upon the other end of the cam-shaft and mounted to rotate therewith is a rock-arm 49, the outer end of which is connected by a pivoted link 50 with the stem 51 of the plunger (shown only in dotted lines) of a dash-pot 52, the plunger being so arranged as to move freely upward within the dash-pot and to be retarded in its downward movement therein. A spring 53 coiled around the cam-shaft and bearing at one end against the upper side of the rock-arm 49 and at the other end against a fixed part, as the base of the adjacent bearing of the cam-shaft, serves to hold the cam-shaft normally in a position fixed by the limit of the downward movement of the plunger within the dash-pot; and it is evident that, when the cam-shaft is rotated through the engagement of the bell-lever with the shoulder of the disk, upon the throwing of the main switch backward to start the motor, thereby raising the rock-arm and the plunger of the dash-pot, this spring will be put under further tension and will, when the bell-lever is tripped and releases the cam-shaft, cause the latter to rotate back slowly, against the retarding action of the dash-pot, to its original position.

A gravity-dog 54, pivoted in lugs secured to the face of the switchboard above the disk 43 and riding normally upon the periphery of the disk, provides simple and efficient means for preventing the starting of the motor without first causing the cam-shaft to rotate to throw resistance into the armature circuit of the motor. As the main switch is thrown backward, to closed position, the end of the lower arm of the bell-lever will, when seated behind and in engagement with the shoulder of the disk, pass beneath the end of the dog (Fig. 4), and will raise it when the bell-lever is tripped at the limit of the backward movement of the switch (Fig. 5) and hold it in raised position until the opening of the switch withdraws the end of the bell-lever and allows the dog to fall back upon the disk. But, since the cam-shaft and disk are caused by the coiled-spring 53 to rotate in a reverse direction immediately upon the release of the disk, on the closing of the switch, the bell-lever arm will ride upon the periphery of the disk in the path of the dog (Fig. 6) when the switch is opened and so prevent its being again closed until the switch has been rocked forward far enough to allow the bell-lever arm to drop back into operative engagement with the shoulder of the disk.

The cam-shaft 14 carries a series of cams 55 which are arranged in staggered position thereon, and are adapted, as the cam-shaft is rotated by the rocking of the main switch and before the latter has closed the motor circuits, to successively engage and rock to open position a series of pivoted resistance switches (here shown as five in number, the number however being immaterial,) and thereby throw resistance into the armature circuit of the motor; and, as the cam-shaft is rotated in the reverse direction upon its release on the closing of the main switch, in the manner already described, the cams thereon will release the said resistance switches, one after the other and in reverse order to their opening, and permit them to return to closed position, thus cutting the resistance out of the armature circuit step by step and accelerating the speed of the motor.

Each of the resistance switches, which are alike in construction and mode of operation, comprises a switch-arm 56, of the bell-lever type, pivotally supported near its angle in a bracket 57, projecting from a base-plate 58 secured to the face of the switchboard, a movable contact-block 59, usually of copper, mounted upon the long upright end of the switch-arm, and, in the path of said movable contact, a fixed carbon contact-block 60 secured in suitable manner to a post 61 of conducting material mounted upon the switchboard. The movable contact-block 59 is yieldingly secured to the switch-arm 56 by a stem 62, which passes loosely through an opening in the head of the switch-arm, and a compression-spring 63, which is coiled around the stem between the parts and normally holds the contact-block at a distance from the switch-arm limited by a nut 64 upon the threaded end of the stem, and is electrically connected with the base-plate 58 by a connector-strip 65 of low resistance. The movable contact-block will thus readily adjust itself relatively to the fixed contact-block, when pressed against the latter, and so insure a good electrical contact. The base-plate 58, common to all the resistance-switches, forms at one end an integral part of or is otherwise connected electrically with the contact-terminal 21, while its other end is in electrical connection, through a stem or post 66 extending through the switchboard and a connector 67 suitably secured to said post at the back of the switchboard, with the shunt field of the motor. The stem 68 of each fixed contact post 61 passes through the switchboard and at the back thereof carries a connector 69 to receive the end of the circuit wires which lead to and divide into sections or units the resistance in the armature circuit of the motor controlled by these switches.

A coiled tension-spring 70, suitably secured at one end to a lug 71 on the switch-arm and at the other to a lug 72 mounted on the face of the switchboard, tends normally to draw the switch-arm to closed position and hold the contact-blocks 59 and 60 in contact with each other. This tendency, however, is resisted and controlled by the action of the cam 55 upon the switch-arm 56 through the medium of a short extension-bar 73, which is pivotally mounted within the slot 74 in the short rearwardly-extending end of the switch-arm and rocks therein to the limited extent permitted by stops 75 and 76 projecting from the switch-arm on either side of its fulcrum, and which carries journaled in its outer end an anti-friction-roller bearing on the periphery of the cam. It is evident that the rotation of the cam-shaft effected by the throwing of the main switch to close the motor circuit will cause each cam in turn to first rock the extension-bar with which it is in engagement until the upper end of the bar bears against the stop 75 on the switch-arm (Fig. 2) and then to rock the switch-arm itself to open position and there hold it against the action of the spring 70. And upon the release of the cam-shaft, simultaneously with the starting of the motor, its rotation in the reverse direction by action of the coiled spring 53 will, by friction, rock all the extension-bars forward so that their lower ends will make contact with the stops 76 on the switch-arms until, as the edge of the enlarged portion of each cam passes the center of the anti-friction-roller in engagement therewith, the extension-bars will rock instantaneously back again and the switch-arms, being thus released, will be successively snapped back by the springs 70 to closed position. In this way there is secured a quick closing of the resistance switches no matter how slowly they are timed to act, one after another, by the adjustment of the dash-pot.

Figure 10:
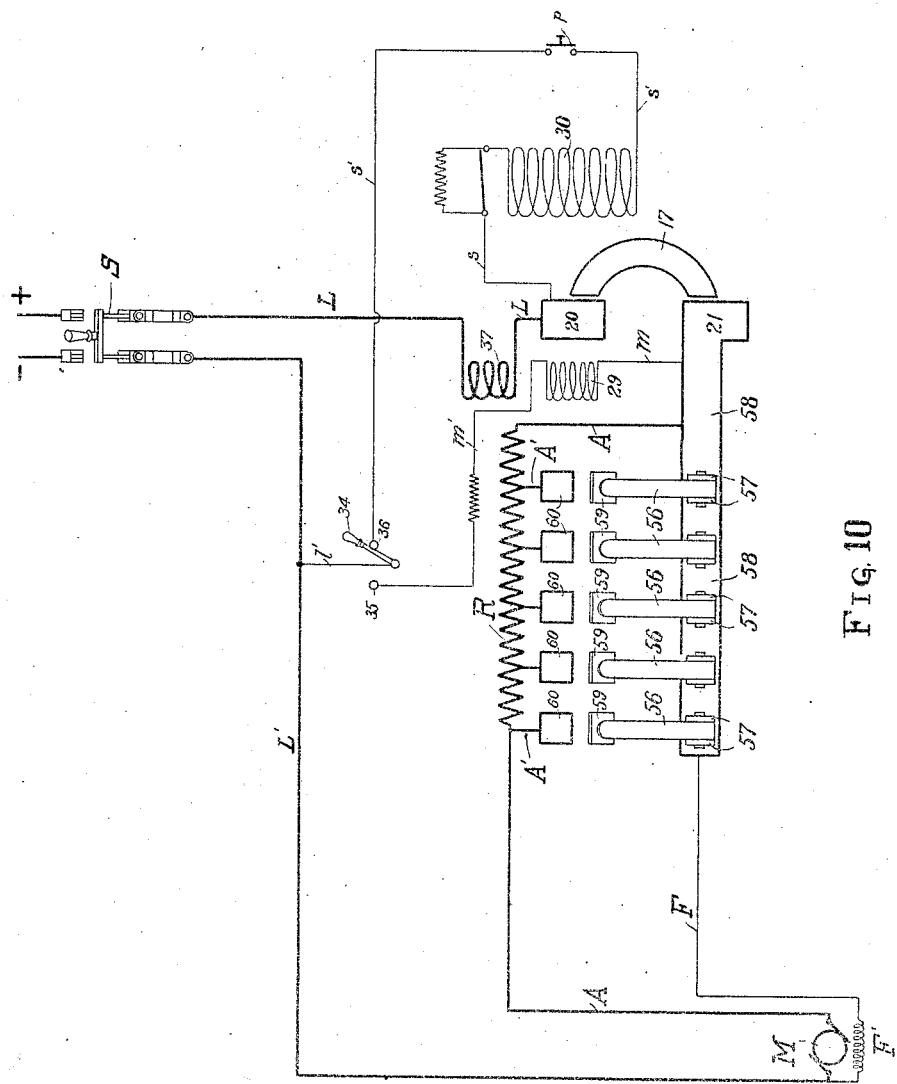

The operation of the apparatus, as above described and with reference also to the electrical circuits illustrated in Fig. 10 of the drawings, is as follows: The usual knife-edge switch S provided at the leading-in terminals being closed and assuming that it is desired to operate the controller manually, the switch 34 is first thrown to the left into contact with the terminal 35 and then the hand-lever 22 is brought forward and raised to the limit of its upward movement, as rapidly or slowly as may be desired, after which it may be dropped. This raising of the hand-lever rocks back and closes the main switch and starts the motor. But as the main switch is rocked and before it closes the motor circuits, the cam-shaft 14 is caused to rotate, in the manner already described, to throw forward the switch-arms 56 and open the resistance switches one after another from left to right. When, therefore, the main switch is closed, the current from the positive leading-in terminal will pass over the main line-wire L, through the coil of the magnet 37, to the contact-terminal 20, thence through the brush circuit-closer 17 to the contact-terminal 21 and to the base-plate 58, where it will divide, one part passing by the wire F to and through the field-winding F' of the motor and thence by the main line-wire L' back to the negative leading-in terminal, another part passing by the wire A, through the resistance R which is now all in circuit, to and through the brushes and armature of the motor M and thence by the main line-wire L' back to the negative leading-in terminal, and a third part passing by the wire m to and through the coil of the magnet 29 and thence by the wire m', terminal 35, switch 34, wire l'', and main line-wire L' back to the negative leading-in terminal. And then, simultaneously with the closing of the main switch and the establishment of the circuits described, the cam-shaft 14 is released from its engagement with the main switch and is caused to rotate in the reverse direction, in the manner explained and as slowly as may be desired, to release the switch-arms 56, allowing them to be snapped back one after another, from right to left, to successively short-circuit the several sections of the resistance R and accelerate the speed of the motor. The motor is stopped by moving the switch 34 away from the contact 35, breaking the circuit through the coil of the magnet 29 and thereby unlocking the main switch and opening the motor circuits. When the controller is to be operated automatically, the switch 34 is thrown to the right into contact with the terminal 36, thereby establishing a circuit through which the current passes from the positive leading-in terminal by the main line-wire L, through the coil of the magnet 37, to the contact-terminal 20, then by the wire s to and through the coil of the solenoid 30, and thence by the wire s' through the pilot switch p to the terminal 36, and by the switch 34, wire l', and main line-wire L' back to the negative leading-in terminal. The solenoid 30, being thus energized, draws up its plunger 31, rocks the rock-shaft 13 and with it the cam-shaft 14, thus first opening the resistance-switches and then closing the main switch and establishing circuits, in addition to the solenoid circuit already described, through which the current passes from the positive leading-in terminal by the main line-wire L, through the coil of the magnet 37, to the contact-terminal 20, to and through the brush circuit-closer 17, to the contact-terminal 21 and to the base-plate 58, and thence, both by the wire F and field-winding F' and by the wire A, through the resistance R, to and through the brushes and armature of the motor M, to the main-line-wire L' and back to the negative leading-in terminal. The sections of resistance are then automatically and successively short-circuited as before. The motor is stopped by breaking the contact between the switch 34 and terminal 36; or, the switch 34 remaining in contact with the terminal 36, the motor can be stopped and started by manipulation of the pilot-switch p.

Whether the controller is being operated automatically or by hand, the motor is fully safeguarded both against a sudden starting and against excessive currents, as has already been pointed out. Thus, a condition of no-voltage in the mains, for any reason whatever, will deënergize either the solenoid 30 or magnet 29 and so release the main switch and open the motor circuits. An excessive current over the main line-wire L will cause the magnet 37 to attract its armature and thus release the loosely pivoted switch-arm from the fixed rock-lever of the main switch and so open the motor circuits. And, by means of the mechanical arrangement described, the main switch, when once opened no matter how slightly, cannot be again closed without first opening all of the resistance switches and throwing all of the resistance into the armature circuit of the motor.

Our new controller is not only simple in construction and reliable in operation but possesses, among others, the advantage that the closing of the resistance switches against the retarding action of the dash-pot is effected only indirectly by the movement either of the hand-lever or of the solenoid plunger, thus permitting such movement to be made rapidly and leaving the coiled-spring 53, in which the power thus created is stored, to release the resistance switches as slowly and at such intervals as may be desired. Thus the action of the solenoid, when the controller is operated thereby, is rendered more efficient and the heating produced by a slow movement of its plunger against the action of a dash-pot is avoided; while the possibility of instantly throwing the hand-lever, to start the motor, is often of great importance, as where, for example, the motor is used to operate a fire-pump. It may also be mentioned that the quick closing of the resistance-switches, no matter how slowly they are timed to act one after the other, is effected entirely by the mechanical construction thereof, thus avoiding the use and incidental inconvenience of individual or supplementary magnets.

While we have described our invention and have explained its principle with reference to the particular embodiment illustrated in the drawings, which we now believe to be the best mode of applying that principle, it is to be understood that its several parts may be variously modified in form, location, and arrangement, or equivalents substituted therefor, or that various parts can be omitted entirely, without departing from the spirit or sacrificing the advantages thereof.

What we claim as new, and desire to secure by Letters Patent, is—

1. The combination, with an electrical circuit, of a movable contact, a fixed contact in the path of said movable contact, means tending normally to hold said contacts in engagement with each other, a cam adapted to throw and hold said movable contact out of engagement with said fixed contact, and means for instantaneously releasing said movable contact from the action of said cam.

2. The combination, with an electrical circuit, of a pivoted bell-lever adapted to open and close said circuit, a shaft carrying a cam, and an operative connection between said cam and bell-lever comprising a bar pivoted in one arm of said bell-lever and having a limited movement with respect thereto.

3. The combination, with an electrical circuit, of a fixed contact, a pivoted bell-lever carrying on one arm a contact adapted to engage said fixed contact and on its other arm a bar having a limited rocking movement with respect thereto, a shaft, a cam secured to said shaft in operative relationship with an end of said rocking bar, and means for rotating said shaft first in one and then in the reverse direction.

4. The combination, with an electrical circuit and resistance-sections adapted to be inserted therein, of a series of switches controlling said resistance-sections, means tending normally to hold said switches in closed relation and adapted to quickly return them to such relation when moved therefrom, a shaft, means operated by said shaft for successively and instantaneously releasing said switches, and means for rotating said shaft first in one direction to open and then in the reverse direction to release said switches.

5. The combination, with an electrical circuit and a series of spring-pressed switches controlling resistance-sections adapted to be inserted in said circuit, of a shaft, means operated by said shaft for opening and for releasing said switches successively, means tending normally to maintain said shaft in a position permitting the closing of said switches, means both manual and electrical for actuating said shaft to open said switches, and means for releasing said shaft from said shaft actuating means after the opening of said switches.

6. The combination, with an electrical circuit and a series of spring-pressed switches controlling resistance-sections adapted to be inserted in said circuit, of a shaft, means operated by said shaft for opening and for releasing said switches successively, a spring tending normally to maintain said shaft in a position permitting the closing of said switches and adapted to slowly return said shaft to such position when moved therefrom, and means for actuating said shaft to open said switches and for then releasing said shaft.

7. The combination, with an electrical circuit and a series of spring-pressed switches controlling resistance-sections adapted to be inserted in said circuit, of a shaft, means operated by said shaft for opening said switches successively and then releasing them successively, a spring tending normally to maintain said shaft in a position permitting the closing of said switches, and a solenoid adapted when energized to actuate said shaft against the action of said spring to open said switches and then to release said shaft.

8. The combination, with an electrical circuit and resistance-sections adapted to be inserted therein, of a series of pivoted switches controlling said resistance-sections and normally held in closed relation, a shaft, means operated by said shaft for operating said switches successively, means both manual and electrical for actuating said shaft to open said switches and then releasing said shaft, and a spring which is put in tension by said shaft actuating means and is adapted to return said shaft when released to its normal position.

9. The combination, with an electrical circuit and resistance-sections adapted to be inserted therein, of a series of pivoted switches controlling said resistance-sections, a shaft and means operated thereby for operating said switches successively, means for rotating said shaft in one direction through a partial revolution and then releasing it, and a spring adapted to be put in tension by the action of said shaft rotating means and to return said shaft when released to its original position.

10. The combination, with an electrical circuit and resistance-sections adapted to be inserted therein, of a switch controlling said circuit, a series of switches controlling said resistance-sections, means for closing said circuit-switch, and means actuated and controlled by the closing movement of said circuit-switch for opening said resistance-switches before and successively closing said resistance-switches after the closing of said circuit-switch.

11. The combination, with an electrical circuit and resistance-sections adapted to be inserted therein, of a switch controlling said circuit, a series of switches controlling said resistance-sections, means both manually and electrically operated for first opening said resistance-switches and then closing said circuit-switch, and means for successively closing said resistance-switches after the closing of said circuit-switch.

12. The combination, with an electrical circuit and resistance-sections adapted to be inserted therein, of a switch controlling said circuit, a series of switches controlling said resistance-sections, means both manually and electrically operated for closing said circuit-switch, and means actuated and controlled by the movement of said circuit-switch to closed position for opening said resistance-switches before the closing of said circuit-switch and after the closing thereof successively closing said resistance-switches.

13. The combination, with an electrical circuit and resistance-sections adapted to be inserted therein, of a switch controlling said circuit, a series of switches controlling said resistance-sections, means for closing said circuit-switch, means actuated by the voltage in the circuit for retaining said circuit-switch in closed position and adapted to release it therefrom in case of no-voltage, and means actuated and controlled by the movement of said circuit-switch to closed position for opening said resistance-switches before the closing of said circuit-switch and after the closing thereof successively closing said resistance-switches.

14. The combination, with an electrical circuit and resistance-sections adapted to be inserted therein, of a switch controlling said circuit, a series of switches controlling said resistance-sections, means for closing said circuit-switch, means actuated and controlled by the movement of said circuit-switch to closed position for opening said resistance-switches before the closing of said circuit-switch and after the closing thereof successively closing said resistance-switches, and means actuated by a current in said circuit exceeding a predetermined limit for releasing and opening said circuit-switch.

15. The combination, with an electrical circuit and a series of spring-pressed pivoted bell-lever switches controlling resistance-sections adapted to be inserted in said circuit, of a shaft, a series of cams secured to said shaft and arranged to open and to release said switches successively through the operative engagement of each with the end of a bar pivoted in one arm of each of said switches and having a limited rocking movement with respect thereto, a spring tending normally to hold said shaft in a position permitting the closing of said switches and adapted to slowly return said shaft to such position when moved therefrom, means for closing said circuit, means actuated and controlled by said circuit-closing means for rotating said cam-shaft to open said switches before and releasing said cam-shaft after the closing of said circuit, and means for opening said circuit in case of no-voltage therein and also in case of a current therein exceeding a predetermined limit.

16. In apparatus of the class described, the combination of a series of pivoted resistance-switches, means tending normally to hold said resistance-switches in closed relation, a shaft, a series of cams secured to said shaft and arranged to open and release said resistance-switches successively, a spring tending normally to hold said cam-shaft in a position permitting the closing of said resistance-switches and adapted to return it to such position when moved therefrom, a rock-shaft, a circuit-switch mounted upon to rock with said rock-shaft, means tending normally to hold said circuit-switch in open relation, means for rocking said circuit-switch to closed relation, and means whereby the working of said circuit-switch to closed relation will actuate said cam-shaft to open said resistance-switches before and release said cam-shaft after said circuit-switch has reached a closed relation.

17. In apparatus of the class described, the combination of a series of pivoted resistance-switches normally held in closed relation, a shaft, a series of cams secured to said shaft and arranged to open and to release said resistance-switches successively, a spring tending normally to maintain said cam-shaft in a position permitting the closing of said resistance-switches, a rock-shaft, a circuit-switch mounted upon said rock-shaft, a hand-lever and a solenoid each of which is adapted to rock said circuit-switch to close the circuit controlled thereby, means whereby the said rocking of said circuit-switch actuates said cam-shaft to open said resistance-switches before and releases said cam-shaft after the closing of said circuit, and means for opening said circuit-switch both in case of no-voltage in said circuit and in case of a current therein exceeding a predetermined value.

18. In apparatus of the class described, the combination of a series of spring-pressed pivoted switches controlling resistance-sections adapted to be inserted in an electrical circuit, a cam-shaft carrying a series of cams adapted to open and to release said resistance-switches successively, a spring tending normally to maintain said cam-shaft in a position permitting the closing of said resistance-switches, a rock-shaft in alinement with said cam-shaft and carrying a switch controlling said circuit, means for actuating said rock-shaft and circuit-switch to close said circuit, and means operatively connecting said cam-shaft with said rock-shaft during and releasing it from said rock-shaft at the end of said circuit-closing movement.

19. In apparatus of the class described, the combination of a series of spring-pressed pivoted switches controlling resistance-sections adapted to be inserted in an electrical circuit, a cam-shaft adapted to open and to release said resistance-switches successively and normally maintained in a position permitting the closing of said resistance-switches, a rock-shaft in alinement with said cam-shaft carrying a switch controlling said circuit, means for actuating said rock-shaft and circuit-switch to close said circuit, means operatively connecting said cam-shaft with said rock-shaft during and releasing it from said rock-shaft at the end of said circuit-closing movement, and means preventing the closing of said circuit when said cam-shaft is not in operative connection with said rock-shaft.

20. In apparatus of the class described, the combination, with a cam-shaft carrying a series of cams adapted to open and to release a series of resistance-switches successively and a rock-shaft in alinement with said cam-shaft and carrying a circuit-switch, of a shouldered-disk mounted upon to rotate with said cam-shaft, a bell-lever mounted upon to rotate with said rock-shaft and adapted to operatively engage the shoulder of said disk, and means for tripping said bell-lever at a predetermined limit of movement of said rock-shaft.

21. In apparatus of the class described, the combination, with a cam-shaft carrying a series of cams adapted to open and to release a series of resistance-switches successively and a rock-shaft in alinement with said cam-shaft and carrying a circuit-switch, of means for turning said rock-shaft in one direction to close said circuit-switch, a shouldered-disk mounted upon to rotate with said cam-shaft, a lever mounted upon to rotate with said rock-shaft and adapted to engage the shoulder of said disk and cause said cam-shaft to rotate with said rock-shaft, means for tripping said lever and releasing said disk substantially on the closing of said circuit-switch, means for returning said disk and cam-shaft when released to their original normal position, and a gravity-dog adapted to prevent the rotation of said rock-shaft to the extent required to close said circuit-switch whenever the said lever is not in engagement with the shoulder of said disk.

22. The combination, with an electrical circuit having a fixed contact-terminal therein, of a switch comprising a rock-lever which is mounted upon to rock with a rock-shaft and a loosely pivoted switch-lever which carries a contact adapted to engage said contact-terminal and is normally locked to and rocks with said rock-lever.

23. The combination, with an electrical circuit having a fixed contact-terminal therein, of a switch comprising a rock-lever which is mounted upon to rock with a rock-shaft and a loosely pivoted switch-lever which carries a contact adapted to engage said contact-terminal and is normally locked to and rocks with said rock-lever, means for rocking said rock-lever to close said switch, means for retaining said rock-lever in closed position which are adapted to release said rock-lever in case of no-voltage in said circuit, and means adapted to unlock said switch-lever from said rock-lever in case of a current in said circuit exceeding a predetermined limit.

24. The combination, with an electrical circuit having a fixed contact-terminal therein, of a switch comprising a rock-lever which is mounted upon to rock with a rock-shaft and a loosely pivoted switch-lever which carries a contact adapted to engage said contact-terminal and is normally locked to and rocks with said rock-lever, a hand-lever and a solenoid each of which is adapted to rock said rock-lever to closed position, and means for releasing said rock-lever from its closed position in case of no-voltage and for unlocking said switch-lever from said rock-lever in case of an excessive current in said circuit.

25. The combination, with an electrical circuit, of a switch controlling said circuit, electrically actuated means for closing said switch and holding it in closed position, manually actuated means for closing said switch and electrically actuated means for holding it in closed position when so closed, and means for electrically connecting either said closing and holding means across the mains of the circuit outside of said switch or said holding means across the mains of the circuit below said switch.

26. The combination, with an electrical circuit, of a switch controlling said circuit, a solenoid adapted when energized to close said switch and hold it in closed relation, a hand-lever adapted to close said switch and an electro-magnet adapted when energized to hold said switch in closed position, and a double-throw switch adapted when moved in one direction to electrically connect said solenoid across the mains of the circuit outside of said circuit-switch and when moved in the opposite direction to electrically connect said electro-magnet across the circuit below said circuit-switch.

27. The combination, with an electrical circuit, of a switch controlling said circuit, electrically actuated means for closing said switch and holding it in closed relation, manually actuated means for closing said switch and electrically actuated means for holding it in closed relation when so closed, and means adapted either to electrically connect said switch closing and holding means across the circuit outside of said circuit-switch or to electrically connect said switch holding means across the circuit below said circuit-switch, as desired.

28. The combination, with an electrical circuit, of a switch controlling said circuit, electrically actuated means adapted to close said switch and to hold it in closed relation, and manually actuated means adapted to close said switch and electrically actuated means adapted to engage said switch when so closed and to hold it in closed relation.

In testimony whereof we have signed our names in the presence of two witnesses.

FRANK W. SMITH.
LOUIS LARSEN.

Witnesses:
WM. B. WHITNEY,
F. A. DOUGHERTY.